US008391457B2

(12) United States Patent
Yin et al.

(10) Patent No.: US 8,391,457 B2
(45) Date of Patent: Mar. 5, 2013

(54) SYSTEMS AND METHODS OF TIMING DTMF TONES FOR TELEPHONY CONTROL

(75) Inventors: Haiyang Yin, Kitchener (CA); Valentina Iqorevna Kramarenko, Toronto (CA)

(73) Assignee: Research In Motion Limited, Waterloo (CA)

( * ) Notice: Subject to any disclaimer, the term of this patent is extended or adjusted under 35 U.S.C. 154(b) by 201 days.

(21) Appl. No.: 12/939,759

(22) Filed: Nov. 4, 2010

(65) Prior Publication Data

US 2011/0275352 A1 Nov. 10, 2011

Related U.S. Application Data

(60) Provisional application No. 61/328,110, filed on Apr. 26, 2010.

(51) Int. Cl.
*H04M 3/42* (2006.01)
*H04M 3/00* (2006.01)
*H04M 5/00* (2006.01)

(52) U.S. Cl. ............... 379/207.02; 379/207.03; 379/283

(58) Field of Classification Search ............... 379/283, 379/207.02, 207.03, 201.01; 370/395.6, 370/352
See application file for complete search history.

(56) References Cited

U.S. PATENT DOCUMENTS

| 5,604,771 A | 2/1997 | Quiros |
| 5,633,862 A | 5/1997 | Suzuki et al. |
| 5,699,417 A | 12/1997 | Khojasteph |
| 5,982,783 A * | 11/1999 | Frey et al. ............. 370/395.6 |
| 7,039,044 B1 | 5/2006 | Whitfield et al. |
| 2005/0096030 A1 | 5/2005 | Boyd et al. |

FOREIGN PATENT DOCUMENTS

| WO | 2008051485 A2 | 5/2008 |
| WO | 2009109068 A1 | 9/2009 |

OTHER PUBLICATIONS

Extended European Search report mailed Dec. 19, 2011. In corresponding application No. 10190012.4.
Office Action mailed Jun. 18, 2012, in corresponding Canadian patent application No. 2,733,630.

\* cited by examiner

*Primary Examiner* — Thjuan K Addy
(74) *Attorney, Agent, or Firm* — Novak Druce + Quigg LLP

(57) ABSTRACT

Control and status information between a mobile device and another device can be signaled over a voice channel using DTMF tones, e.g., a pre-defined sequence of DTMF tones can signal a desired message (more generally, a feature code). Tones sent are separated from each other by a time gap ($T_{gap}$ timer). If a receiving device does not receive a sequence of DTMF tones that can be matched to stored definitions of feature codes, then the receiving device generates a negative ACK. Also, if the sending device does not receive either negative or positive ACK, then sending device resends all tones of the feature code after a retry delay ($T_{retry}$ timer). Rather than having the $T_{retry}$ timer start when tones for a feature code start to be transmitted, the $T_{retry}$ timer is started after the $T_{gap}$ timer expires for the last tone of a feature code. Thus, only one timer is running (either $T_{gap}$ or $T_{retry}$), rather than having multiple timers running concurrently. Race conditions between the timers are avoided.

23 Claims, 6 Drawing Sheets

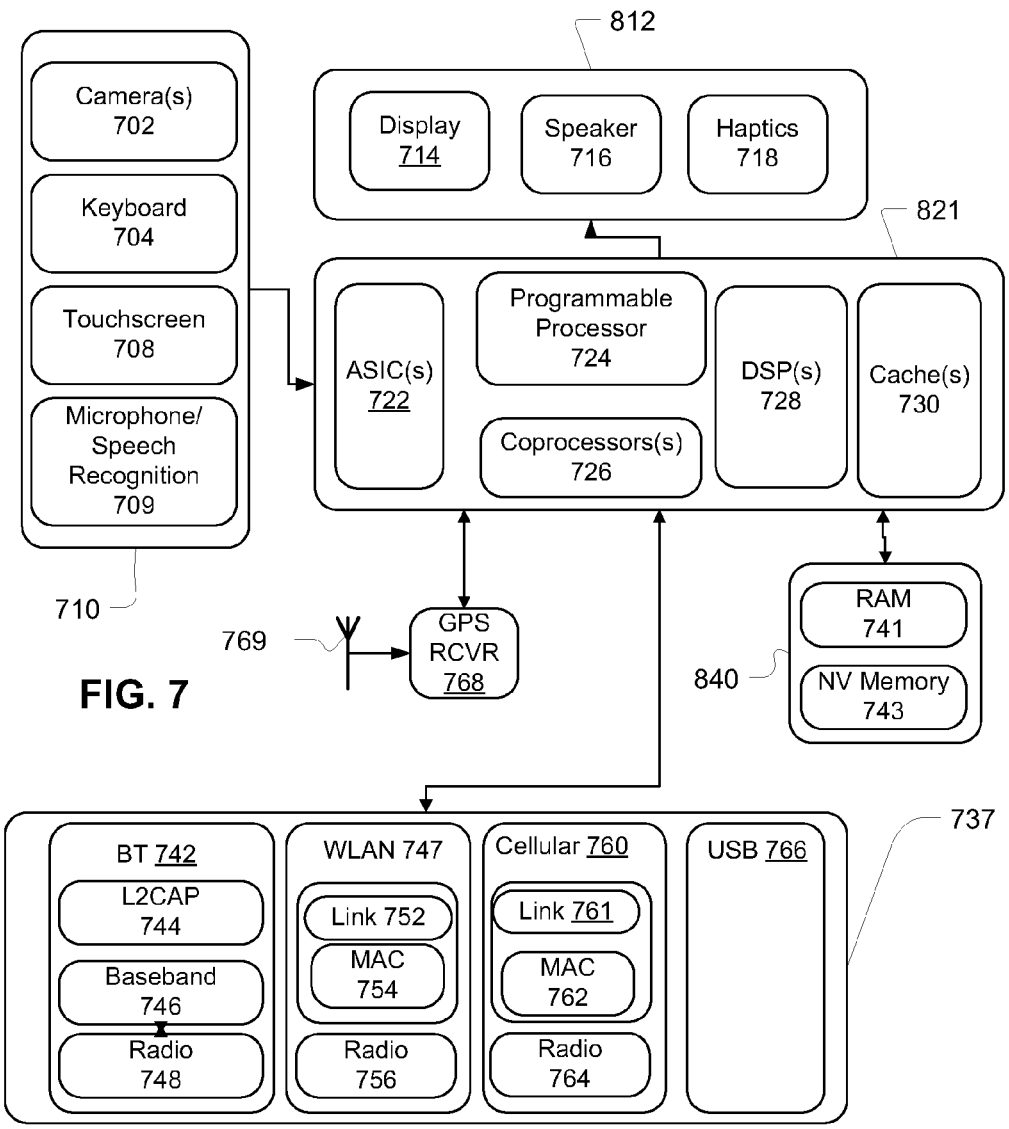
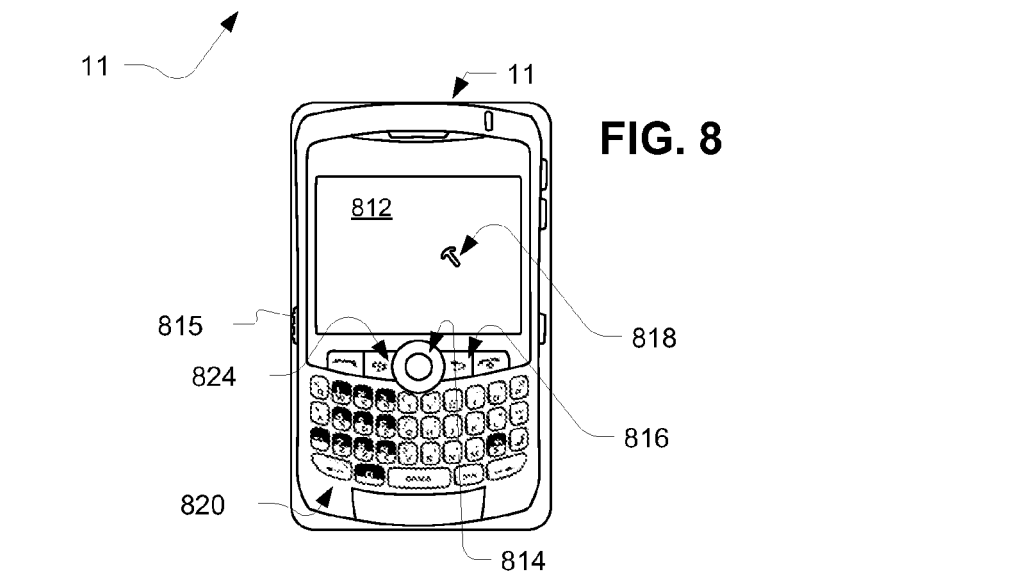

SYSTEMS AND METHODS OF TIMING DTMF TONES FOR TELEPHONY CONTROL

CROSS REFERENCE TO RELATED APPLICATIONS

This application claims priority from U.S. Provisional Pat. App. Ser. No. 61/328,110, filed on Apr. 26, 2010, the contents of which are incorporated herein in their entirety for all purposes.

BACKGROUND

1. Field

The present application relates to voice telephony, and more particularly to control and status signaling over voice channels, such as in third party call control scenarios.

2. Related Art

Voice telephony remains a major application of interest for business and personal use. In an example corporate setting, a telephony installation at a site can have a large number of users connected to a Private Branch Exchange (PBX) server, which can interface those users to a smaller number of outside lines (e.g., an E1 or T1 line) (a PBX can be implemented using a server with telephony cards for example). A PBX can interface with other servers and systems, such as one or more application servers that can provide enhanced services to devices connected to the PBX, such as mobile devices. For example, a PBX can interface with an application server over an IP connection, using SIP signaling. Services provided by an application server can include voice mail, single number reachability, call forwarding, park, and conferencing, for example. PBX systems also can communicate with each other over trunk lines, and packet networks, depending on implementation.

A PBX can perform services for a voice call, based on direction from an application server. For example, a PBX can initiate an outgoing call to a number specified by an application server using SIP signaling to the PBX. A PBX also can provide information about incoming calls to an application server. For example, a PBX can provide ANI information, to an application server, for a call incoming to the PBX, which may be provided a service by the application server. An application server can provide what are known as third party call control services to voice devices. In third party call control, an application server can control aspects of a call in which it is not a party. Such control can include controls such as transfer, remote mute, and so on. Where a data channel between the application server and a party to the call exists, then such commands can be signaled and acknowledged over that data channel. In the absence of a data channel, DTMF tones provided over the voice channel are used. Continuing to enhance a user experience even when using such DTMF tones is desirable.

BRIEF DESCRIPTION OF THE DRAWINGS

Reference will now be made, by way of example, to the accompanying drawings which show example embodiments of the present application, and in which:

FIG. 7 depicts an example composition of a mobile device that can perform aspects in accordance with this disclosure;

FIG. 8 depicts another view of an example of a mobile device that can perform aspects in accordance with this disclosure.

DESCRIPTION

In many cases, modern mobile devices, such as phones, smartphones, and other network-enabled devices can access both a data network and a voice network (depending on technology, access of each network type may occur concurrently or interleaved). It is becoming increasingly desirable, especially for corporate users, to be able to use their mobile phones in a manner similar to their deskphones, such as having similar functionality, one number reachability, and so on. Such capabilities can be provided to mobile devices through an application server that can send and receive status information and control commands over a data channel with the mobile device. If a data channel is not currently available, DTMF tones can be sent over a voice channel for these purposes.

Although data networks, such as those operating according to well-known packet switching protocols have flow control and error recovery mechanism to establish reliable transport, e.g. windowing, sequence of ordering and buffering, voice networks do not provide similar control and recovery mechanisms for DTMF tones.

In these disclosures, DTMF tones can be used to indicate feature request and response codes, for example. Those codes may contain at least one DTMF digit ([0-9*#A-D]), each tone is sent individually with some time gap between digits. These tones cannot be sent like a UDP packet or TCP packet.

For example, there is no sequencing to control the order of request and response codes and a receiving end cannot tell a sending side which feature code or response code, or portion thereof has an error. Rather, when the receiving end detects any error in (or cannot process) a feature code or response code, it can only request the sending end to retransmit the last feature code or response.

Figure 1:
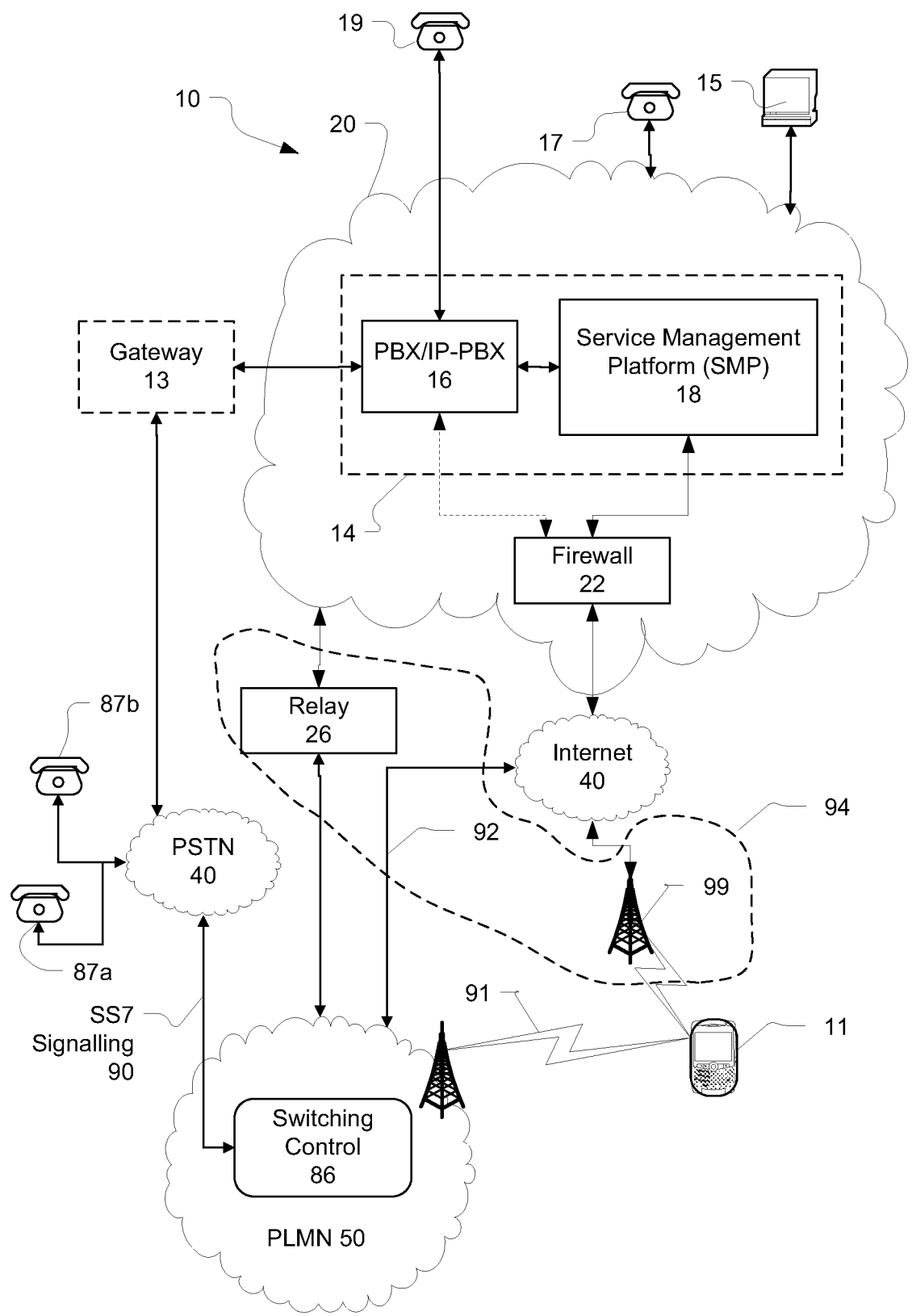
FIG. 1 shows, in block diagram form, an example arrangement in which voice calls involving mobile devices can be setup, and which involves an enterprise communications platform.

FIG. 1 depicts an example arrangement, which will be used in the following description. In some aspects, this description concerns an approach to reducing a setup time for a call involving a wireless device and carried on a transport that includes elements of the Public Switched Telephony Network (PSTN). The elements of FIG. 1 are introduced, followed with background to provide context to the particular examples that follow.

FIG. 1 depicts an arrangement where a PBX 16 can exist within a corporate network. PBX 16 can be coupled to the Public Switched Telephone Network (PSTN) 40, such as via a T1 trunk, or through a gateway 13 that interfaces between the PSTN and a packet network technology. Gateway 13 also can convert between packet network signaling, such as H.245 or SIP to PSTN signaling such as ISDN signaling. PBX 16 also can be coupled to the Internet 40, or to other packet networks, through a firewall 22, and other network equipment such as routers and switches (not separately depicted). PBX 16 also can have a connection to both the PSTN and one or more packet networks.

Traditionally, a PBX (e.g., PBX 16) provides telephony services for a closed group of private telephones, for example, within an enterprise or a hotel. However, in many cases the services to the private telephone desirably could also be extended out to a mobile device that communicate via third party networks, such as wide area cellular networks, or through wireless local area networks. In these situations SMP server 18 may be added as an adjunct to the PBX and can take an active role in providing services to mobile devices.

SMP server 18 can be connected to PBX 16 through a packet-switched connection that can use the Internet Protocol (IP).

PSTN 40 can communicate with Public Land Mobile Network (PLMN) 50, and by particular example, with a switching control 86 within PLMN 50. Such communication is for accepting calls from PLMN 50 to be carried on PSTN 40, and vice versa, as an example. SS7 signaling can be employed between PSTN 40 and PLMN 50. PSTN 40 is depicted to have telephones 87a and 87b coupled thereto. Other implementations can include multiple gateways that translate between or among different signaling protocols.

PLMN 50 communicates with a mobile device 11. Communication between PLMN 50 and mobile device 11 can take place using a wide variety of technologies, some of which are capable of supporting only voice traffic, either voice traffic and data traffic, or simultaneous voice and data traffic to/from mobile device 11. PLMN 50 also can use Internet 40 to receive/send traffic to and from corporate network 20, as indicated by communication link 92. Communication between network 20 and PLMN 50 also may be carried via a relay 26.

Mobile device 11 includes one or more radio transceivers and associated processing hardware and software to enable wireless communications with the PLMN 50 and optionally a WLAN. In various embodiments, the PLMN 50 and mobile device 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within PLMN 50 as well as into other PLMNs (i.e., that the depicted PLMN 50 represents one or more such wireless access networks that operate according to what a person of ordinary skill would understand as broadband cellular access technologies).

For example, in some instances, a dual-mode mobile device 11 and/or the enterprise network 20 can be configured to facilitate roaming between the PLMN 50 and a WLAN, and are thus capable of seamlessly transferring sessions (such as voice calls) from a connection with a cellular interface of a dual-mode device to a WLAN interface of such a dual-mode device, and vice versa.

GSM signaling 91 can be implemented using the Fast Associated Control Channel (FACCH). FACCH is a logical channel on a digital traffic channel that can be used to send urgent signaling control messages. The FACCH channel sends messages by replacing speech data with signaling data for short periods of time. In GSM, two special reserved bits are used to inform the receiving device if the data in the current time slot is digitally coded subscriber traffic or alternatively a FACCH message. Switching control 86 manages the conversion between GSM signaling 91 and SS7 signaling 90 (for clarity, a network of base stations operating within PLMN 50 is not separately depicted, and usually, there is a connection between switching control 86, and one or more base station elements, where device 11 can be connected to such base station elements. GSM signaling can be relayed through the base station to a termination point in switching control 86.)

In some embodiments, PBX 16 may be connected to one or more conventional analog telephones 19. The PBX 16 is also connected to (or part of) the enterprise network 20 and, through it, to telephone terminal devices, such as digital telephone sets 17, softphones operating on computers 15, and so on. Within the enterprise network, each individual may have an associated extension number, sometimes referred to as a PNP (private numbering plan), or direct dial phone number. Calls outgoing from PBX 16 to PSTN 40 or incoming from PSTN 40 to PBX 16 can be circuit-switched calls (typically in the absence of gateway 13). Gateway 13 also can be considered part of enterprise network 20, and a boundary of such enterprise network 20 depicted in FIG. 1 is primarily for convenience. Within the enterprise, e.g. between the PBX 16 and terminal devices, voice calls are increasingly packet-switched calls, for example Voice-over-IP (VoIP) calls.

SMP server 18 can perform some aspects of messaging or session control, like call control and advanced call processing features. SMP server 18 may, in some cases, also perform some media handling. Collectively, SMP server 18 and PBX 16 may be referred to as the enterprise communications platform (server), generally designated 14. It will be appreciated that the enterprise communications platform 14 and, in particular, SMP server 18, can be implemented on one or more servers having suitable communications interfaces for connecting to and communicating with the PBX 16, and other network connections. Although SMP server 18 may be implemented on a stand-alone server, it will be appreciated that it may be implemented into an existing control agent/server as a software component comprising instructions configuring a processor, operating with other software components to implement the functionality attributed to it. As will be described below, SMP server 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs).

One of the functions of enterprise communications platform 14 is to extend the features of enterprise telephony to the mobile devices 11. For example, the enterprise communications platform 14 cay allow mobile device 11 to perform functions akin to those normally available on a standard office telephone, such as the digital telephone set 17 or analog telephone set 15. Example features may include direct extension dialing, enterprise voice mail, conferencing, call transfer, call park, etc.

The depicted system may include a number of enterprise-associated mobile devices (device 11 is depicted). Device 11 can be a device equipped for cellular communication through the PLMN 50, or a dual-mode device capable of both cellular and WLAN communications.

Enterprise network 20 typically includes a number of networked servers, computers, and other devices. For example, enterprise network 20 may connect one or more desktop or laptop computers 15 (one shown). The connection may be wired or wireless in some embodiments. The enterprise network 20 may also connect to one or more digital telephone sets 17 (one shown).

Dashed boundary 94 depicts that where there is no data channel, these connections may be absent, such that usage of a voice channel for status and control signaling would be used.

Figure 2:
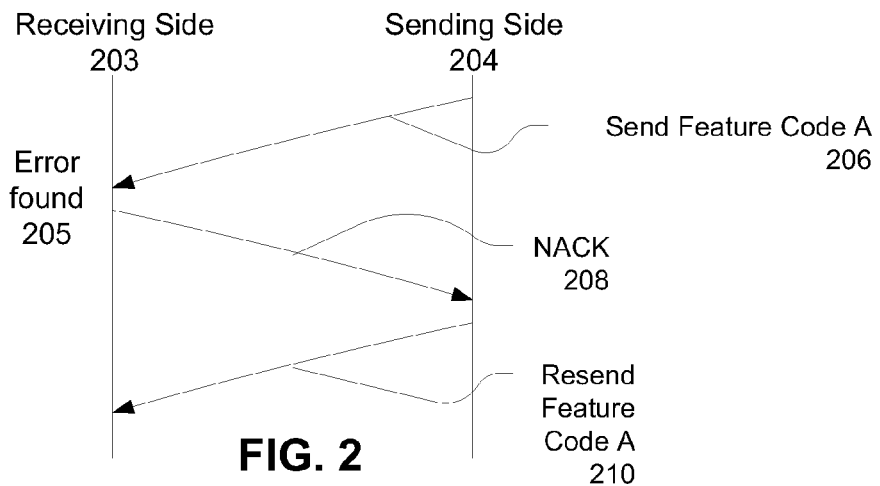
FIG. 2 depicts feature code sending, negative acknowledgement when a feature code is not received.

FIG. 2 depicts an overview where a sending side 204 sends feature code A to a receiving side 203. Referencing FIG. 1, sending side 204 can be PBX 16, server 18 (communicating through PBX 16) and then receiving side 203 generally would be mobile device 11, or vice versa. FIG. 2 depicts that feature code A is sent (206), and an error is discovered 205 in the feature code A at receiving side 203. Such an error can include that the feature code did not match to locally stored definitions for available feature codes. For example, one or more tones may not have been properly received. In response to error (205), receiving side 203 generates a negative acknowledgement (NACK 208). When sending side 204 receives NACK 208, it resends the tones of feature code A. FIG. 2 thus depicts that multiple iterations of sending and acknowledging (or negative acknowledging) can occur for each feature code sent. Multiple feature codes may be sent. In some cases, responses from receiving side 203 also may be sent (i.e., responses other than simply N/ACKs); in these cases, receiving side 203 can function as sending side 204 and vice versa.

Figure 3:
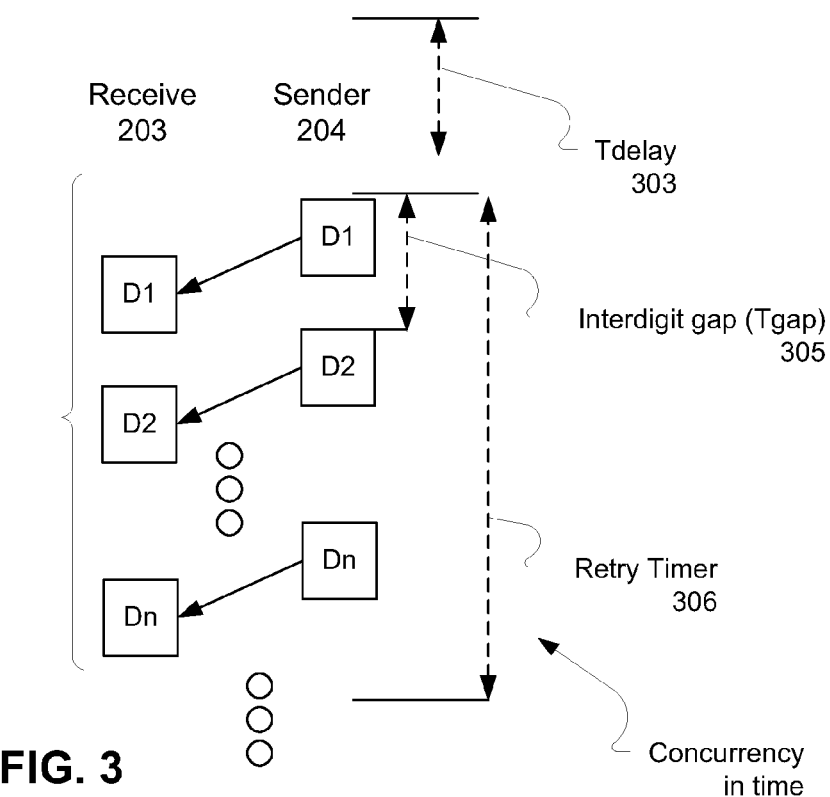
FIG. 3 depicts aspects of how DTMF tones for a feature code can be sent and received, with appropriate delays.

FIG. 3 depicts aspects introduced in FIG. 2 in more detail. In particular, DTMF tones sent on a voice channel should be separated in time from each other so that they can be sent or received properly. Also, to demarcate an end of a feature code, it also can be desirable to introduce a somewhat longer delay between tones of different feature codes (or iterations of the same feature code). One way to approach these considerations is shown in FIG. 3, where an inter-digit gap (inter-tone gap) 305 is started when sending a tone. Concurrency also with the beginning of sending a first tone for a given feature code, a $T_{retry}$ timer 306 can be started. The $T_{retry}$ timer 306 times how long sending side 204 would wait until retrying the feature code to be sent. $T_{retry}$ timer 306 would expire, causing retransmission of a feature code in situations where, for example, no positive acknowledgement or negative acknowledgement of the feature code was received. In that case, sending side 204 does not know whether or not receiving side 203 got the feature code. Thus, the inter-digit $T_{gap}$ timer 305 and $T_{retry}$ timer 306 run concurrently in this situation.

Figure 4:
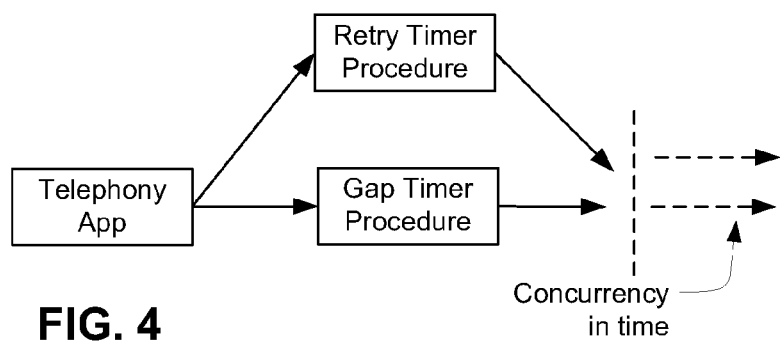
FIG. 4 depicts that timers for the delays in FIG. 3 run concurrently in some DTMF timing situations.

As depicted in FIG. 4, these concurrently running timers can cause race conditions that need to be accounted for during tone transmission. Preferably, rather than having such concurrently running timers, in aspects according to this disclosure, timers preferably run serially, as described below.

Figure 5:
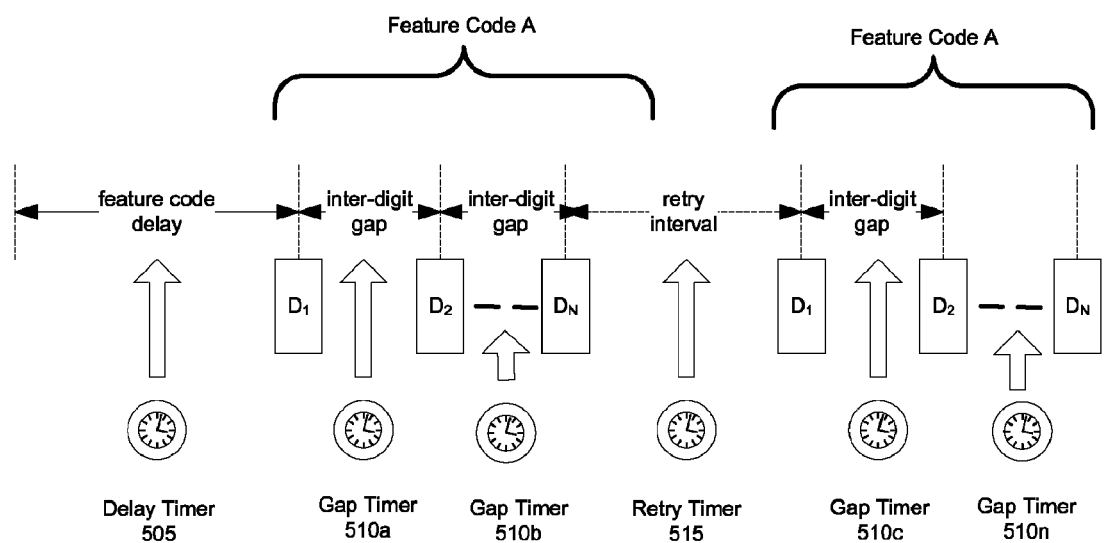
FIG. 5 depicts a preferred approach where DTMF timers are run sequentially and not concurrently.

FIG. 5 depicts the serialization of the various timings that should be accounted for during DTMF feature code transmission. First, a $T_{delay}$ timer 505 can be started to run serially, before transmission of tones for a feature code. $T_{delay}$ timer 505 can be used, for example, to introduce delay to allow setting up of a cellular channel before starting tone transmission. Eventually, $T_{delay}$ timer 505 expires, and a tone $D_1$ can be sent, and $T_{gap}$ timer 510a is started, similarly with $D_2$, and $T_{gap}$ timer 510b. Ultimately, a final tone of feature code A is transmitted ($D_N$), and retry interval clocked by $T_{retry}$ timer 515 is begun. As can be seen here, the total duration of time tracked by $T_{retry}$ timer 515 is longer, as it does not run concurrently with any $T_{gap}$ timer or other processes occurring while transmitting the rest of the tones of feature code A. Upon $T_{retry}$ timer expiring, further actions can be taken, and in the example of FIG. 5, feature code A was not properly received, and so resending of the tones of feature code A is begun, with $T_{gap}$ timer 510c, 510n, and so on being started and used to time the sending of the tones.

Figure 6:
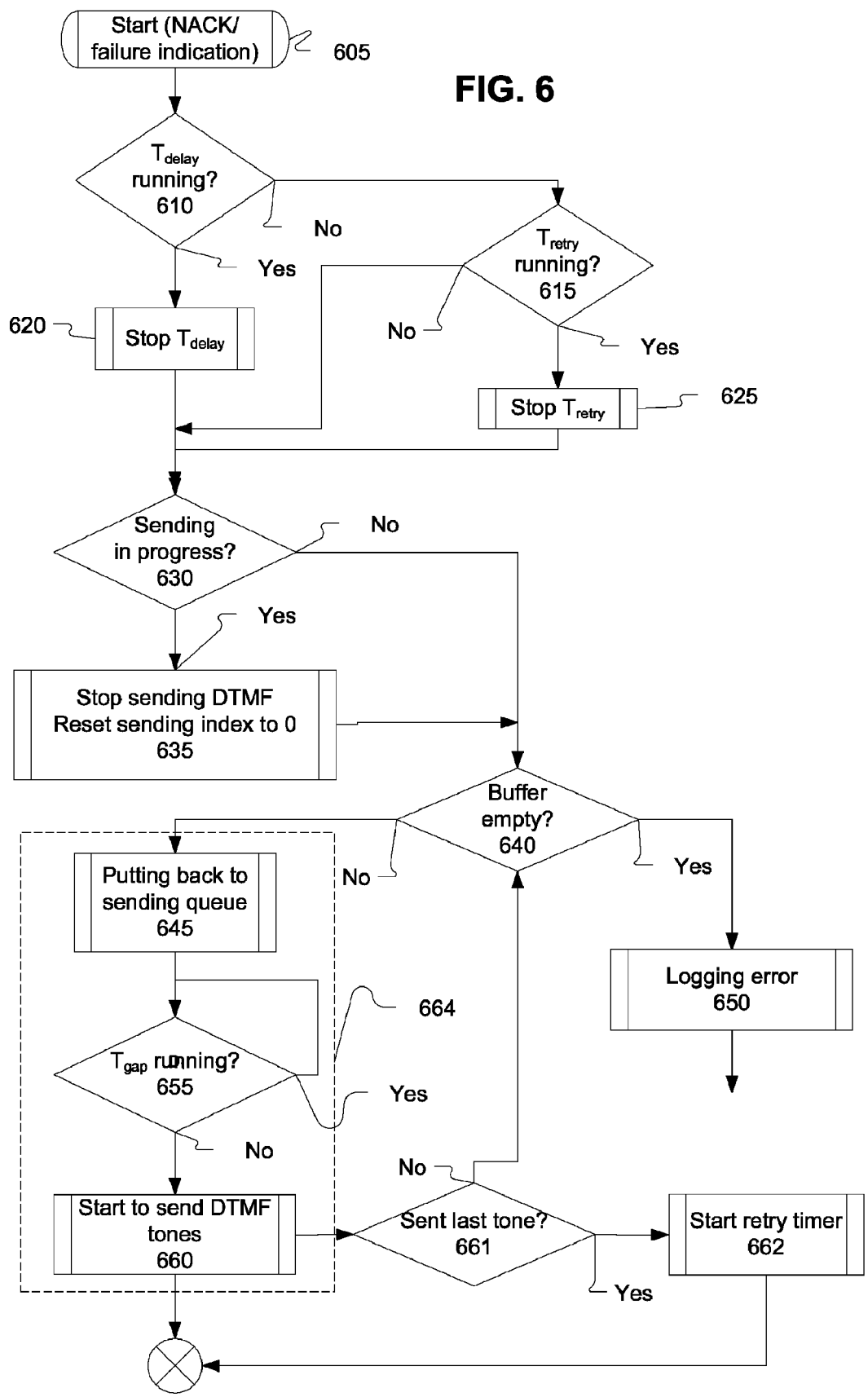
FIG. 6 depicts a method for error correction according to one example of serial timer execution.

FIG. 6 depicts an approach to error correction that can be performed at sending side 204. The depicted method starts (605) at a point where a NACK was received (i.e., that there is an error that should be corrected by tone retransmission). If the $T_{delay}$ timer is running (610), then that $T_{delay}$ timer is stopped (620). If the $T_{delay}$ timer is not running, and the $T_{retry}$ timer is running (615), then the $T_{retry}$ timer is stopped (625). Subsequently, it is determined whether tone sending is in progress (630). If so, then the sending of tones is stopped, and a sending index also can be reset (635). After 630 or 635, it is determined whether a tone buffer is empty (640). If empty, then the error is logged (650). If the buffer is not empty, then the tones for the previous feature code found to be received in error are reintroduced into the sending buffer (queue) (645). Before sending such tones, the running of the $T_{gap}$ timer is checked (655), if it is running, then sending waits for expiration of the $T_{gap}$ timer. After $T_{gap}$ timer expires, tone sending is started (660). Resending of tones can be considered a collection of storing tones to be transmitted in queue (645), checking for $T_{gap}$ running (655) and starting to send (660) DTMF tones, if $T_{gap}$ is not running.

In these examples, it was shown that the $T_{retry}$ timer was started (662) after sending the last digit (determination 661). An alternative equivalent formulation is to run the $T_{gap}$ timer again, and shorten the $T_{retry}$ timer by an appropriate amount; again, keeping their serialization.

FIG. 7 depicts example components that can be used in implementing a mobile transceiver device 11 according to the above description. FIG. 2 depicts that a processing module 721 may be composed of a plurality of different processing elements, including one or more ASICs 722, a programmable processor 724, one or more co-processors 726, which each can be fixed function, reconfigurable or programmable, one or more digital signal processors 728. For example, an ASIC or co-processor 722 may be provided for implementing graphics functionality, encryption and decryption, audio filtering, and other such functions that often involve many repetitive, math-intensive steps. Processing module 721 can comprise memory to be used during processing, such as one or more cache memories 730.

Processing module 721 communicates with mass storage 740, which can be composed of a Random Access Memory 741 and of non-volatile memory 743. Non-volatile memory 743 can be implemented with one or more of Flash memory, PROM, EPROM, and so on. Non-volatile memory 743 can be implemented as flash memory, ferromagnetic, phase-change memory, and other non-volatile memory technologies. Non-volatile memory 743 also can store programs, device state, various user information, one or more operating systems, device configuration data, and other data that may need to be accessed persistently.

User input interface 710 can comprise a plurality of different sources of user input, such as a camera 702, a keyboard 704, a touchscreen 708, and a microphone, which can provide input to speech recognition functionality 709.

Processing module 721 also can use a variety of network communication protocols, grouped for description purposes here into a communication module 737, which can include a Bluetooth communication stack 742, which comprises a L2CAP layer 744, a baseband 746 and a radio 748. Communications module 737 also can comprise a Wireless Local Area Network (747) interface, which comprises a link layer 752 with a MAC 754, and a radio 756. Communications module 737 also can comprise a cellular broadband data network interface 760, which in turn comprises a link layer 761, with MAC 762. Cellular interface 760 also can comprise a radio for an appropriate frequency spectrum 764. Communications module 737 also can comprise a USB interface 766, to provide wired data communication capability. Other wireless and wired communication technologies also can be provided, and this description is exemplary.

Referring to FIG. 8, there is depicted an example of mobile device 11. Mobile device 11 comprises a display 812 and a cursor or view positioning device, here depicted as a trackball 814, which may serve as another input member and is both rotational to provide selection inputs and can also be pressed in a direction generally toward housing to provide another selection input. Trackball 814 permits multi-directional positioning of a selection cursor 818, such that the selection cursor 818 can be moved in an upward direction, in a downward direction and, if desired and/or permitted, in any diagonal direction. The trackball 814 is in this example situated on a front face (not separately numbered) of a housing 820, to enable a user to maneuver the trackball 814 while holding mobile device 11 in one hand. In other embodiments, a trackpad or other navigational control device can be implemented as well.

The mobile device 11 in FIG. 8 also comprises a programmable convenience button 815 to activate a selected application such as, for example, a calendar or calculator. Further, mobile device 11 can include an escape or cancel button 816, a menu or option button 824 and a keyboard 820. Menu or option button 824 loads a menu or list of options on display 812 when pressed. In this example, the escape or cancel button 816, menu option button 824, and keyboard 829 are disposed on the front face of the mobile device housing, while the convenience button 815 is disposed at the side of the housing. This button placement enables a user to operate these buttons while holding mobile device 11 in one hand. The keyboard 829 is, in this example, a standard QWERTY keyboard.

Figure 9:
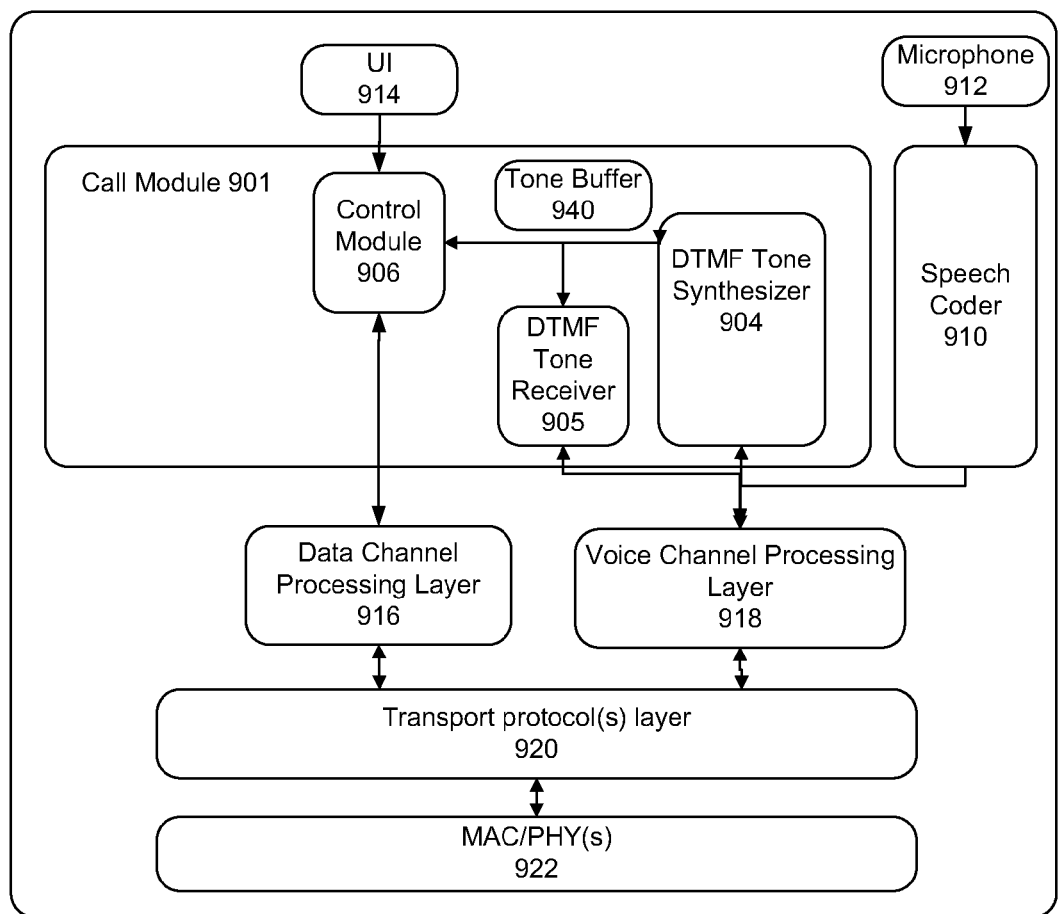
FIG. 9 depicts a functional module composition of a mobile device in accordance with this disclosure.

FIG. 9 depicts an example functional module organization of mobile device 11, and which includes a call module 901. Call module 901 device 11 includes Media Access Controller (s) and PHYsical media layers that can be managed by the MACs (922) and a transport protocol(s) module 920 interfaced with the MAC/PHYs. A voice channel processing layer module 918 interfaces with transport control (20), and receives input from a DTMF tone synthesizer and a speech code 910 that receives input from a microphone 912. Voice channel processing layer 918 also interfaces with a DTMF tone receiver 905 that can detect DTMF tones sent on a voice channel involving transport control 920 and MAC/PHY 922. A control module 906 also can interface with each of DTMF tone receiver 905 and synthesizer 904 to both receive information represented by received tones and generate information to be sent using DTMF tones. A UI 914 interfaces with control module 906. Transport module in turn interfaces with one or more MAC/PHY modules 922. Collectively, voice channel processing module 918, transport module 920, and MAC/PHY module(s) 922 provide a stack for transmission and reception of voice information for a call, as well as command and status information relating to such call. A tone buffer 940 is provided which can be used both by DTMF tone synthesizer 904 and DTMF tone receiver 905 (or only one of them) for buffering DTMF tone information either received or waiting to be sent. In these disclosures, the usage of the terms sending, send, sent, and the like comprehend the storing of information describing tones that are to be sent in tone buffer 940.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A method of signaling information over a voice channel, comprising:
sending sequentially, on the voice channel and from a sending device, a plurality of Dual Tone MultiFrequency (DTMF) tones defined by a feature code definition, wherein each of the tones is separated by a time gap ($T_{gap}$) tracked by a $T_{gap}$ timer;
starting a $T_{retry}$ timer subsequent to sending the last tone of the feature code definition;
receiving an indication that the receiving device did not receive DTMF tones that could be mapped to a valid feature code definition; and
responsive to receiving the indication,
if the $T_{retry}$ timer is running at the sending device, stopping the $T_{retry}$ timer,
if the $T_{gap}$ timer is running, waiting for the $T_{gap}$ timer to expire, and
resending the DTMF tones of the previous sent feature code.

2. The method of claim 1, wherein the resending of the DTMF tones comprises storing data for the DTMF tones in a tone buffer.

3. The method of claim 1, further comprising retrieving the feature code definition from a non-transitory computer readable medium.

4. The method of claim 1, wherein the sending of the DTMF tones comprises storing the tones in a queue to be sent on the voice channel.

5. The method of claim 1, further comprising delaying a start of the sending by a time delay controlled by a $T_{delay}$ timer.

6. The method of claim 5, wherein if the $T_{delay}$ timer is running while the indication is received, stopping the $T_{delay}$ timer prior to the resending.

7. The method of claim 5, wherein determining that the $T_{delay}$ timer is running is sufficient to determine that neither the $T_{retry}$ timer nor the $T_{gap}$ timer is running.

8. The method of claim 1, wherein the $T_{retry}$ timer running is sufficient to conclude that the $T_{gap}$ timer is not running.

9. The method of claim 1, wherein the $T_{gap}$ timer running is sufficient to conclude that the $T_{retry}$ timer is not running.

10. A system for signaling control information over a voice channel, comprising:
    a sending device configured to send Dual Tone MultiFrequency (DTMF) tones for a feature code on a voice channel, which are obtained from a memory storing definitions of feature codes, each comprising a plurality of DTMF tones, the sending device configured to separate each DTMF tone sent by a pre-defined gap time delay determined by a $T_{gap}$ timer, and to separate the tones of each feature code by a retry time delay defined by a $T_{retry}$ timer, which is started by the sending device following the sending of the last tone of the feature code being sent; and
    a receiving device comprising a DTMF tone receiver for receiving a group of DTMF tones and comparing a pattern of received DTMF tones with definitions of feature codes, each comprising a respective plurality of DTMF tones, and for generating a negative acknowledgement if the received group of DTMF tones does not match any feature code definition.

11. The system of claim 10, wherein the sending device is further configured to receive the negative acknowledgement, and if the $T_{retry}$ timer is running, to stop the $T_{retry}$ timer, if the $T_{retry}$ timer is not running and $T_{delay}$ timer is running, to stop the $T_{delay}$ timer and if the $T_{gap}$ timer is running, to allow the $T_{gap}$ timer to expire, and then to begin resending the tones of the previously sent feature code.

12. The system of claim 10, wherein the sending device is one of PBX and a server coupled with the PBX, and the receiving device is a mobile device.

13. The system of claim 10, wherein $T_{gap}$ is shorter than $T_{retry}$.

14. A non-transitory computer readable medium storing instructions for configuring one or more processing modules to perform a method of signaling information over a voice channel, the method comprising:
    sending sequentially, on the voice channel and from a sending device, a plurality of Dual Tone MultiFrequency (DTMF) tones defined by a feature code definition, wherein each of the tones is separated by a time gap ($T_{gap}$) tracked by a $T_{gap}$ timer;
    starting a $T_{retry}$ timer subsequent to sending the last tone of the feature code definition;
    receiving an indication that the receiving device did not receive DTMF tones that could be mapped to a valid feature code definition; and
    responsive to receiving the indication,
        if the $T_{retry}$ timer is running at the sending device, stopping the $T_{retry}$ timer,
        if the $T_{gap}$ timer is running, waiting for the $T_{gap}$ timer to expire, and
        resending the DTMF tones of the previous sent feature code.

15. The non-transitory computer readable medium of claim 14, wherein the resending of the DTMF tones comprises storing data for the DTMF tones in a tone buffer.

16. The non-transitory computer readable medium of claim 14, further storing feature code definitions.

17. The non-transitory computer readable medium of claim 14, wherein the sending of the DTMF tones comprises storing the tones in a queue to be sent on the voice channel.

18. The non-transitory computer readable medium of claim 14, further comprising delaying a start of the sending by a time delay controlled by a $T_{delay}$ timer.

19. The non-transitory computer readable medium of claim 18, wherein if the $T_{delay}$ timer is running while the indication is received, stopping the $T_{delay}$ timer prior to the resending.

20. The non-transitory computer readable medium of claim 18, wherein determining that the $T_{delay}$ timer is running is sufficient to determine that neither the $T_{retry}$ timer nor the $T_{gap}$ timer is running.

21. The non-transitory computer readable medium of claim 14, wherein the $T_{retry}$ timer running is sufficient to conclude that the $T_{gap}$ timer is not running.

22. The non-transitory computer readable medium of claim 14, wherein the $T_{gap}$ timer running is sufficient to conclude that the $T_{retry}$ timer is not running.

23. A method of signaling information over a voice channel, comprising:
    providing a Dual Tone MultiFrequency (DTMF) definition of a code for use in providing information between a sending device and a receiving device on the voice channel, wherein the DTMF definition of the code comprises a plurality of DTMF tones to be transmitted on the voice channel;
    providing a definition of a time gap ($T_{gap}$) between each tone comprised in the definition of the code;
    providing a definition of a retry delay ($T_{retry}$) to be used when resending the DTMF tones on the voice channel; and
    enforcing a policy that both $T_{gap}$ and $T_{retry}$ cannot run concurrently for timing sending of DTMF tones of the code on the voice channel.

* * * * *